US006975588B1

(12) United States Patent
Katukam et al.

(10) Patent No.: US 6,975,588 B1
(45) Date of Patent: Dec. 13, 2005

(54) METHOD AND APPARATUS FOR COMPUTING A PATH THROUGH A BIDIRECTIONAL LINE SWITCHED

(75) Inventors: Suresh Katukam, Rohnert Park, CA (US); Venkataraman Anand, Petaluma, CA (US)

(73) Assignee: Cisco Technology, Inc., San Jose, CA (US)

( * ) Notice: Subject to any disclaimer, the term of this patent is extended or adjusted under 35 U.S.C. 154(b) by 816 days.

(21) Appl. No.: 09/872,176

(22) Filed: Jun. 1, 2001

(51) Int. Cl.[7] .............................................. G01R 31/08
(52) U.S. Cl. ...................................... 370/222; 370/227
(58) Field of Search ............................... 370/216, 221, 370/222, 225, 227, 228, 400, 401, 402, 403, 370/404, 405, 351, 238

(56) References Cited

U.S. PATENT DOCUMENTS

| | | | | |
|---|---|---|---|---|
| 5,253,248 | A | 10/1993 | Dravida et al. | 370/16 |
| 5,459,716 | A | 10/1995 | Fahim et al. | |
| 5,467,345 | A | 11/1995 | Cutler, Jr. et al. | 370/60 |
| 5,497,368 | A | 3/1996 | Reijnierse et al. | 370/54 |
| 5,546,542 | A | 8/1996 | Cosares et al. | |
| 5,627,822 | A | 5/1997 | Edmaier et al. | 370/218 |
| 5,854,899 | A | 12/1998 | Callon et al. | 395/200.68 |
| 5,901,137 | A * | 5/1999 | Nakabayashi | 370/222 |
| 5,923,646 | A | 7/1999 | Mandhyan | |
| 5,942,989 | A | 8/1999 | Nagasawa et al. | |
| 6,026,394 | A * | 2/2000 | Tsuchida et al. | 707/3 |
| 6,073,248 | A | 6/2000 | Doshi et al. | 714/4 |
| 6,078,590 | A | 6/2000 | Farinacci et al. | 370/432 |
| 6,130,875 | A | 10/2000 | Doshi et al. | |
| 6,185,210 | B1 | 2/2001 | Troxel | 370/395 |
| 6,249,510 | B1 * | 6/2001 | Thompson | 370/223 |
| 6,430,150 | B1 | 8/2002 | Azuma et al. | |
| 6,567,194 | B1 * | 5/2003 | Badr | 398/1 |
| 6,614,754 | B1 * | 9/2003 | Usuba et al. | 370/222 |
| 6,646,990 | B1 | 11/2003 | Gray et al. | |
| 6,671,819 | B1 | 12/2003 | Passman et al. | |
| 6,728,205 | B1 | 4/2004 | Finn et al. | |
| 6,744,769 | B1 * | 6/2004 | Siu et al. | 370/395.32 |
| 6,751,190 | B1 | 6/2004 | Swallow | |
| 6,765,880 | B1 | 7/2004 | Hillard et al. | |
| 6,775,477 | B2 * | 8/2004 | Badr | 398/1 |
| 6,785,224 | B2 | 8/2004 | Uematsu et al. | |
| 6,798,747 | B1 | 9/2004 | Watkins et al. | |
| 2001/0019540 | A1 * | 9/2001 | Uematsu et al. | 370/258 |
| 2002/0027885 | A1 | 3/2002 | Ben-Ami | |
| 2002/0054572 | A1 | 5/2002 | Saleh et al. | |
| 2002/0141334 | A1 * | 10/2002 | Deboer et al. | 370/227 |
| 2003/0076818 | A1 | 4/2003 | Naranjo al | |
| 2003/0133417 | A1 | 7/2003 | Badt, Jr. | |

* cited by examiner

*Primary Examiner*—Chau Nguyen
*Assistant Examiner*—Blanche Wong
(74) *Attorney, Agent, or Firm*—Aka Chan LLP

(57) ABSTRACT

Methods and apparatus for automatically creating a path through a bi-directional line switched ring which uses common time slots are disclosed. According to one aspect of the present invention, an apparatus for creating a path between first and second nodes through a third node using first and second links includes a querying device, a comparator, and a routing device. The querying device identifies a first time slot of the first link for transferring data from the first node to the third node, and also identifies a second time slot associated with the second link for transferring data between the third node and the second node. The comparator determines when the first time slot and the second time slot are consistent, and the routing device computes the path between the first and second nodes using the first and second time slots when the first and second time slots are consistent.

44 Claims, 6 Drawing Sheets

METHOD AND APPARATUS FOR COMPUTING A PATH THROUGH A BIDIRECTIONAL LINE SWITCHED

BACKGROUND OF THE INVENTION

1. Field of Invention

The present invention relates generally to data communication systems. More particularly, the present invention relates to systems and methods for substantially automating the computation of a circuit path through a bi-directional line switched ring that meets common time slot requirements.

2. Description of the Related Art

The demand for data communication services is growing at an explosive rate. Much of the increased demand is due to the fact that more residential and business computer users are becoming connected to the Internet. Furthermore, the types of traffic being carried by the Internet are shifting from lower bandwidth applications towards high bandwidth applications which include voice traffic and video traffic.

To address the demand for data communication services, the use of optical networks, such as a synchronous optical network (SONET), is becoming more prevalent. A SONET network is an example of a time division multiplexed (TDM) network. TDM networks generally allocate single lines to be used amongst multiple users, or customers of data communication services. The single lines may each be divided into slots of time during which each user has access to the single lines.

A network such as a TDM network is generally designed to ensure that information may be transferred between nodes within the network. Often, within a network, information is transferred between two specified nodes, i.e., a source node which sends information and a destination node which receives information. When information is to be sent between a source node and a destination node, a circuit path between the two nodes must be computed so that leased line services may be provided.

In general, a network may include at least one bi-directional line switched ring (BLSR). A BLSR generally allows data traffic to be sent in opposite directions. That is, for a bi-directional ring, traffic is typically routed such that both directions of a two-way connection travel along the ring using the same ring nodes, but in opposite directions. A BLSR may typically include either two fibers or four fibers. A two fiber BLSR is a ring in which traffic is normally routed in both directions, i.e., in a clockwise direction and a counter-clockwise direction.

FIG. 1*a* is a diagrammatic representation of a BLSR which may be part of a network. A BLSR 104 includes network elements such as nodes 108 and fibers 112. Nodes 108 are communicably connected to other nodes 108 using fibers 112. BLSR 104, as shown, is a two-fiber BLSR as any link between two nodes 108 uses two fibers 112. Within BLSR 104, when data traffic is to travel between node A 108*a* and node B 108*b*, the point or node 108*b* at which the data traffic enters determines the direction in which the data traffic is routed.

When data traffic enters at node A 108*a* and is to exit at node B 108*b*, then the data traffic travels in a substantially clockwise direction 116 along fiber 112*a*. Alternatively, when data traffic enters at node B 108*b* and is to exit at node A 108*a*, then the data traffic travels in a substantially counter-clockwise direction 120 along fiber 112*b*.

When a fiber, e.g., fiber 112*a*, fails, that fiber may no longer be used to route data traffic. That is, when fiber 112*a* fails, fiber 112*a* may not be used to transfer data between node A 108*a* and node B 108*b* in a clockwise direction. As fiber 112*b* is used to transfer data between node B 108*b* and node A 108*a* in a counter-clockwise direction, data typically may not be routed from node A 108*a* to node B 108*b* using fiber 112*b*. Hence, when fiber 112*a* fails, an attempt generally must be made to identify an alternate route between node A 108*a* and node B 108*b*.

With reference to FIG. 1*b*, the identification of an alternate path between nodes, i.e., node A 108*a* and node B 108*b*, will be described. Within BLSR 104, when fiber 112*a* fails, an alternate path which routes data traffic in a clockwise direction from node A 108*a* to node B 108*b* is identified to allow data traffic to be routed to node B 108*b* from node A 108*a*. As shown, an alternate counter-clockwise or anti-clockwise path 124 from node A 108*a* to node B 108*b* uses fiber 112*g*, fiber 112*e*, and fiber 112*c*. That is, alternate path 124 passes from node A 108*a* to node C 108*c* using fiber 112*g*, passes from node C 108*c* to node D 108*d* using fiber 112*e*, and passes from node D 108*d* to node B 108*b* through fiber 112*c*.

Typically, within a BLSR, there are protected time slots or channels. Specifically, each fiber within a BLSR may be divided into channels. By way of example, if a fiber is a link which meets OC-48 requirements associated with SONET standards, i.e., if a fiber is an OC-48 link, then the fiber has twenty four working channels or time slots and twenty four protected channels or time slots. The twenty four working channels may be the first twenty-four channels on a OC-48 link, while the twenty four protected channels may be the last twenty-four channels on the OC-48 link.

Working channels of a fiber or a link are allocated for use to transfer data between nodes which are communicably connected by the fiber or the link. The number of available channels on a link at any given time effectively defines the bandwidth on the link. FIG. 2*a* is a diagrammatic representation of two fibers between nodes that a part of a BLSR. A node A 204 and a node B 208 are in communication through fibers 212, 216. Fiber 212 may be arranged to transfer data from node A 204 to node B 208, whereas fiber 216 may be used to transfer data from node B 208 to node A 204. That is, fiber 212 may be used to transfer data in a clockwise direction from node A 204 to node B 208, while fiber 216 may be used to transfer data in a counter-clockwise direction from node B 208 to node A 204.

Fiber 212 includes channels 220, or time slots, and fiber 216 includes channels 224. Channels 220, 224 include both working channels, i.e., channels through which data is routed under most conditions, and protected channels, i.e., channels through which circuit paths are routed when a selected working channel fails. As will be appreciated by those skilled in the art, a working channel generally has an associated protected channel. By way of example, if fibers 212, 216 are OC-48 links, then a working channel in a fifth time slot associated with fiber 212 is associated with a protected channel in a twenty-ninth time slot associated with a different fiber. In the event that the fifth time slot goes down, the data that was intended to be transferred through the fifth time slot is transferred through the twenty-ninth time slot instead.

Typically, within a BLSR, time slots used to transfer data must be consistent, i.e., the same. In other words, if data is to be transferred from node A 204 to node B 208, then from node B 208 to another node, the channel 220 used in fiber 212 must be the same as the channel used in a link between node B 208 and the other node. As shown in FIG. 2*b*, if data is transferred across a channel '5' 220*a* from node A 204 to node B 208, then that same data is transferred across a channel '5' 256*a* on a link 252 between node B 208 and a node C 248.

The use of consistent time slots throughout a circuit path segment in a BLSR substantially ensures that the failure of a link between a source node and a destination node does not prevent data from being successfully transmitted between the source node and the destination node. For instance, referring back to FIG. 1*b*, 1*f* a transmission is intended to be sent from node A 108*a* to node B 108*b* on channel "5" across link 112*a*, and link 112*a* fails, then the transmission is sent from node A 108*a* to node B 108 on channel "29" on link 112*g*, link 112*e*, and link 112*c*. As discussed above, working channel "5" is associated with protected channel "29." If inconsistent channels are used in a circuit path segment, e.g., if channel "5" 220*a* and channel "7" 256*b* as shown in FIG. 2*c* are used, to transmit data between two nodes then if one of the channels fails and node B 108*b* fails, the destination node is not aware of whether it should expect a transmission over a protected channel "29" or a protected channel "31," as specified by BLSR protocols. Hence, the transmission of the signal may be unacceptably delayed while it is determined which channel the destination node should expect a transmission from. It should be appreciated that if node B 108*b* is "alive," node B 108*b* may convert channel "29" to channel "5."

Circuit paths are often protected such that a failure of a node associated with a path does not prevent data which would have been routed through the path from being successfully transmitted. In general, substantially all network links of a BLSR much use the same channels or time slots such that a path which uses the network links is protected even when a node fails. For example, if an intermediate node between a source node and a destination node fails, then the use of consistent channels allows the destination node to be substantially instantly aware of which protected channel of an alternate route to expect a transmission to be received over.

Identifying time slots which are available throughout a BLSR is generally a task that is performed by a network administrator. Typically, each node of a BLSR is aware of which channels or time slots are available on physical links which are associated with the BLSR. Hence, the network administrator may access substantially any node in the BLSR to determine which channels are available for routing a circuit path segment through the BLSR. FIG. 2*c* is a diagrammatic representation of nodes A 204, node B 208, and node C 248 of FIG. 2*b*. For ease of illustration, only channels of fibers 212, 252 are shown. When a path through a BLSR ring is to be created beginning at node A 204, e.g., a source node, and ending at node C 248, e.g., an end node, to ensure that a protected path is possible even in the event of a nodal failure, it is determined which working channels are available between node A 204 and node B 208, as well as between node B 208 and node C 248.

As will be appreciated by those skilled in the art, node A 204 is aware of which channels 220 are available between node A 204 and node B 208, as well as all other channels within a BLSR. If channel '5' 220*a* is available between node A 204 and node B 208, but substantially only channel '7' 256*b* is available between node B 208 and node C 248, then if protection in the event of a nodal failure is desired, it must be determined if channel '7' between node A 204 and node B 208 is available for use.

When a circuit path that uses a BLSR to be routed, a network administrator conventionally studies the available channels between nodes of the BLSR through which a circuit path is to be created. Then, the network administrator manually selects the channel which is to be used between all nodes of the BLSR, and creates the circuit path through the selected channel, e.g., when a path protection is desired. Manually routing a path between a source node and a destination node in a BLSR such that each link uses the same time slot is time consuming and, hence, inefficient, particularly in large networks. For instance, BLSRs may include up to sixteen nodes. Further, when a path is manually routed, the likelihood that the path is routed incorrectly increases. Such an error may cause an overall network to operate inefficiently.

Therefore, what is needed is an efficient method and apparatus for causing network links in a BLSR to use the same time slot. That is, what is desired is an efficient system which enables links of a circuit path within a BLSR which use the same time slots to be created substantially automatically.

SUMMARY OF THE INVENTION

The present invention relates to a system for substantially automatically creating a circuit path through a bi-directional line switched ring such that the same, or common, time slots are used in the links of the circuit path. According to one aspect of the present invention, an apparatus for creating a path between a first network element and a second network element through a third network element that is in communication with the first network element across a first link and in communication with the second network element across a second link includes a querying device, a comparator, and a routing device. The querying device is arranged to substantially automatically identify at least a first time slot associated with the first link that is available for use in transferring data between the first network element and the third network element. The querying device further also substantially automatically identifies at least a second time slot associated with the second link that is available for use in transferring data between the third network element and the second network element. The comparator compares the first time slot and the second time slot to determine when the first time slot and the second time slot are consistent, and the routing device substantially automatically computes the path between the first network element and the second network element using the first time slot of the first link and the second time slot of the second link when the first time slot and the second time slot are consistent, e.g., common.

In one embodiment, the querying device identifies time slots associated with the first link that are available for use in transferring data between the first network element and the third network element, and also identifies time slots associated with the second link that are available for use in transferring data between the third network element and the second network element. In such an embodiment, the comparator may compare the time slots associated with the first link that are available for use in transferring data between the first network element and the third network element and the time slots associated with the second link that are available for use in transferring data between the third network element and the second network element. Such a comparison enables a subset of time slots associated with the first link that are consistent with a subset of time slots associated with the second link to be identified.

An apparatus that enables time slots which are consistent, e.g., common, with respect to different links in a bi-directional line switched ring to be identified enables a circuit path through the bi-directional line switched ring to be readily computed. Automatically identifying common time slots within a bi-directional line switched ring substantially eliminates the need to manually create circuits through segments of the bi-directional line switched ring Hence, the creation of a path which meets common time slot requirements to be met may be efficiently created.

According to another aspect of the present invention, a bi-directional line switched path ring includes a source node being arranged to receive information from an information source, a destination node, and at least one intermediate node. A first link, which includes a first plurality of channels, enables the source node to be in communication with the intermediate node therethrough, and a second link that includes a second plurality of channels enables the intermediate node and the destination node to be in communication therethrough. The source node includes a first indicator that is arranged to identify a first channel included in the first plurality of channels as being available for use in transferring the information across the first link, and the intermediate node includes a second indicator that is arranged to identify a second channel included in the second plurality of channels as being available for use in transferring information across the second link. When first channel included in the first plurality of channels is substantially the same as the second channel included in the second plurality of channels, the source node includes a third indicator which identifies both the first channel included in the first plurality of channels and the second channel included in the second plurality of channels as being available for use in transferring the information from the source node to the destination node.

In one embodiment, the source node identifies substantially all channels included in the first plurality of channels that are available for use in transferring the information across the first link. Additionally, the source node also identifies substantially all channels included in the second plurality of channels that are effectively same as the channels included in the first plurality of channels that are available for use in transferring the information across the first link. In such an embodiment, the channels included in the second plurality of channels that are substantially the same as the channels included in the first plurality of channels that are available for use in transferring the information across the first link are identified on the source node as virtual links between the source node and the destination node.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

Within a network such as a time division multiplexed (TDM) network which is subject to synchronous optical network (SONET) standards, manually routing circuit path segments between source nodes and destination nodes through a bi-directional line switched ring (BLSR) often proves to be time consuming and inefficient. In addition, when a path segment is manually routed, the likelihood that the path segment is routed incorrectly increases. Path segments are often manually routed, as for example when a path segment between two nodes in a BLSR is constrained to use consistent time slots or channels on links in the BLSR. Conventional algorithms which are used to route path segments through a BLSR are typically not able to substantially automatically create path segments given constraints which require that consistent time slots be used throughout a path segment between a source node and a destination node.

In one embodiment of the present invention, common time slots or channels on multiple physical links of a BLSR which enable information to be routed from a source node to a destination node are may be substantially automatically identified. By identifying common time slots on multiple physical links, and advertising the common time slots on at least the source node, a routing device may select common time slots over which data may be transferred from the source node to the destination node.

Automatically selecting common time slots over multiple links between a source node and a destination node and, hence, automatically creating circuit path segments between the source node and the destination node essentially avoids the need to manually create segments of a circuit through a BLSR when common time slots are to be used. Automatically creating circuit path segments through a BLSR may substantially limit the amount of information propagated through an overall network by effectively restricting time slot information to being exchanged within the BLSR, and not throughout the overall network.

Figure 1A:
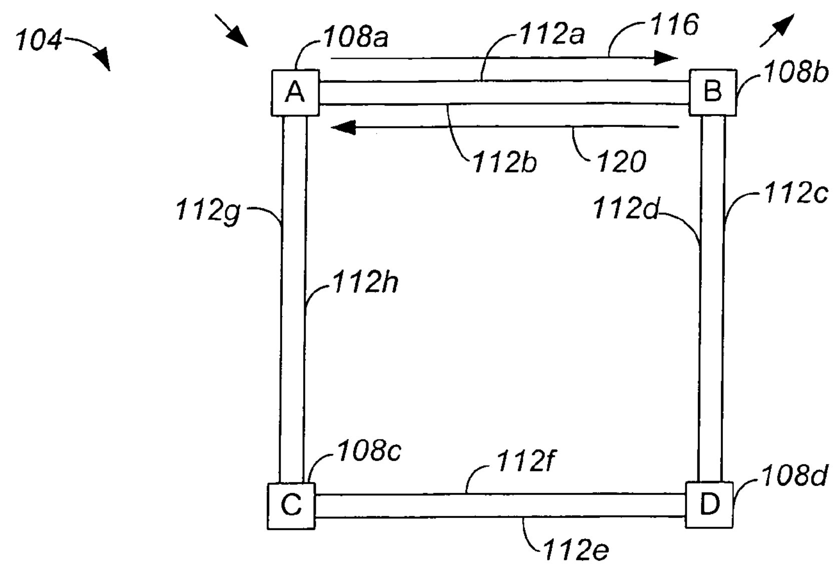
FIG. 1*a* is a diagrammatic representation of a bi-directional line switched ring (BLSR) which may be part of a network.
Figure 1B:
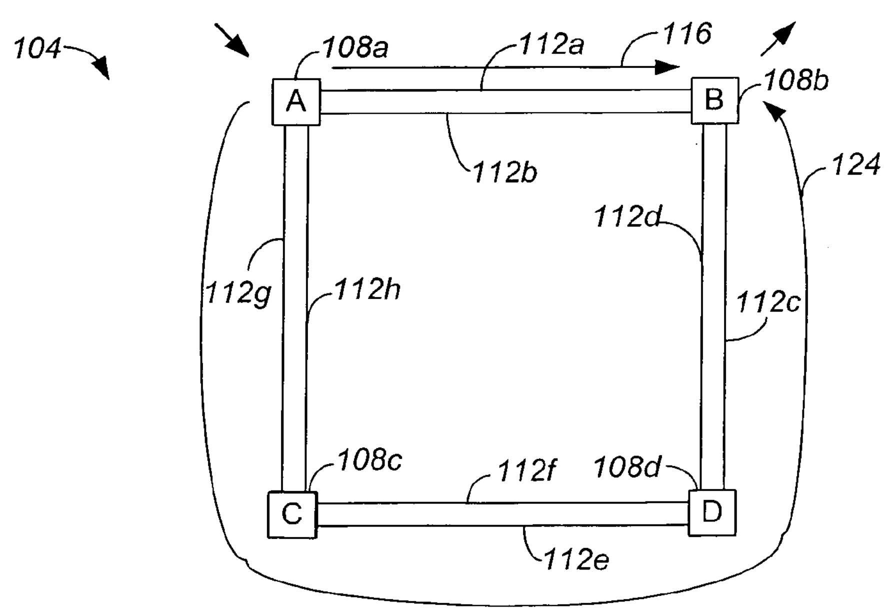
FIG. 1*b* is a diagrammatic representation of a BLSR which shows a path and an alternate path between nodes.
Figure 2A:
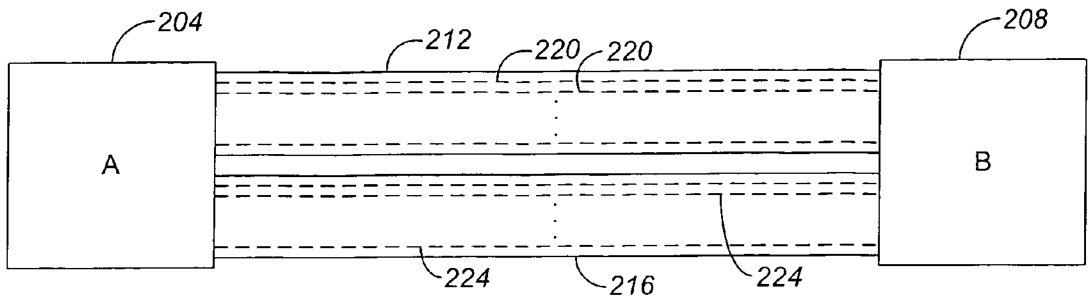
FIG. 2*a* is a diagrammatic representation of two fibers between nodes that a part of a BLSR.
Figure 2B:
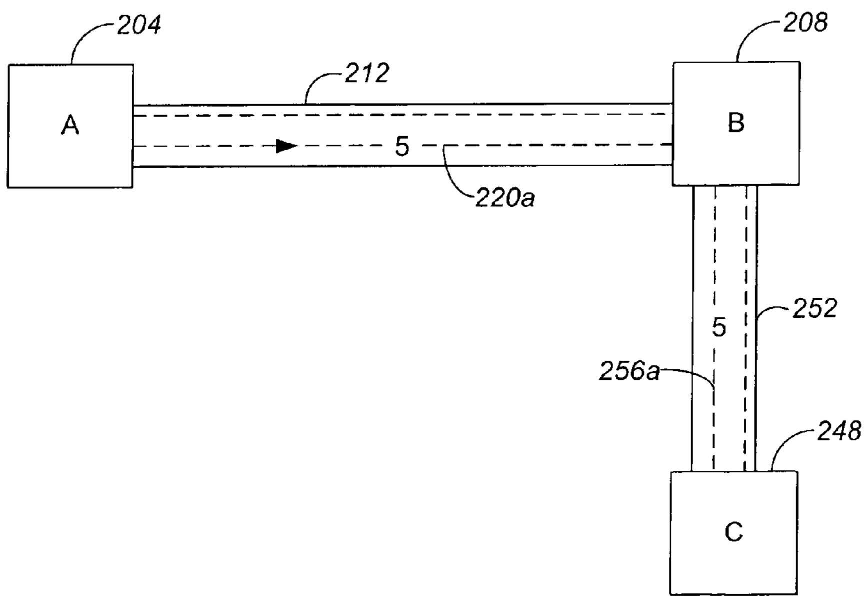
FIG. 2*b* is a diagrammatic representation of fibers which allow data to be transmitted in one direction between nodes of a BLSR.
Figure 2C:
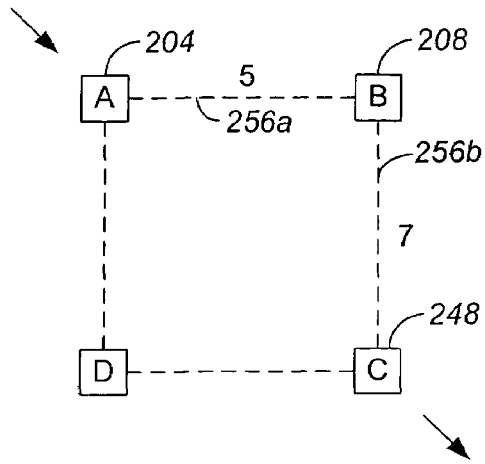
FIG. 2*c* is a diagrammatic representation of nodes A 204, node B 208, and node C 248 of FIG. 2*b*.
Figure 3:
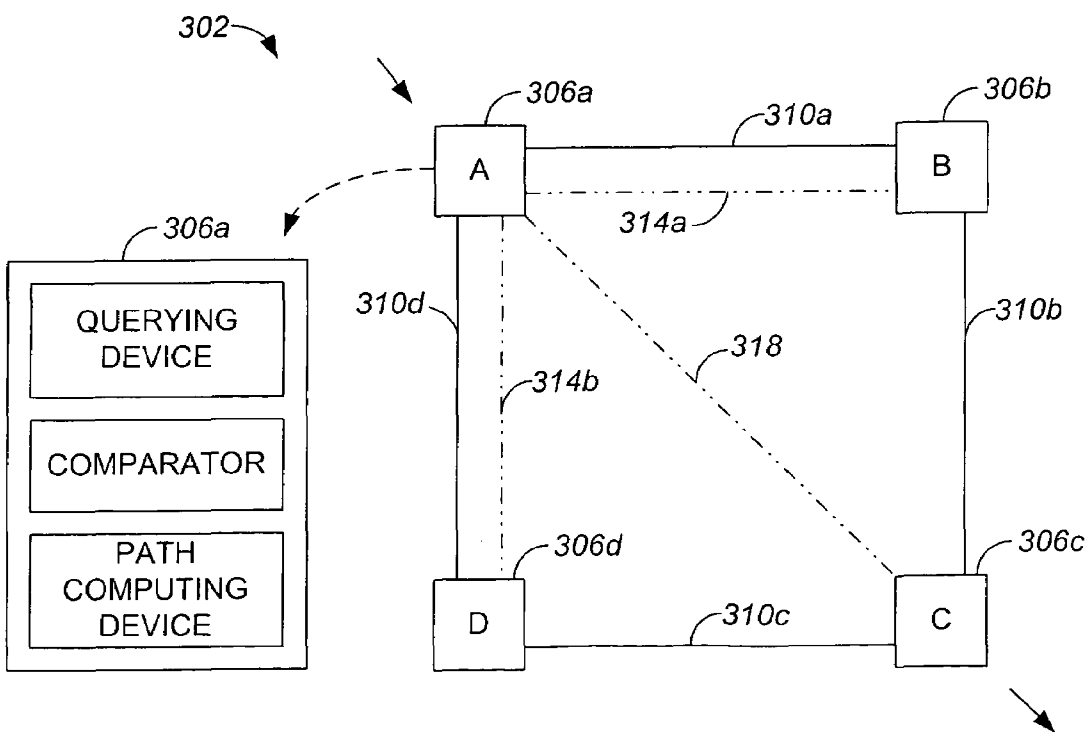
FIG. 3 is a diagrammatic representation of a BLSR with a virtual link in accordance with an embodiment of the present invention.

A network element such as a node in a BLSR generally needs to communicate with other nodes in the BLSR about available time slots. When a node determines the available time slots associated with the BLSR, then a time slot which is common on all links of a proposed circuit path segment may be selected for use in transferring data. FIG. 3 is a diagrammatic representation of a BLSR which advertises common time slots on direct physical links and "virtual" links in accordance with an embodiment of the present invention. A virtual link may be considered to be a representation of common time slots on a physical link between a source node and a destination node which includes two or more links. That is, a virtual link may represent time slots that are common in a path between a source node and a destination node that includes more than one physical, or actual link. A BLSR 302 includes network elements, or nodes 306, which are interconnected by physical, or actual, links 310. Although BLSR 302 may include either two or four fibers between nodes 306, for ease of illustration, pairs of fibers are represented by links 310.

Links 310 generally have both working time slots, or channels, and protected time slots, or channels. Nodes 306 are generally aware of available time slots associated with each link 310 within BLSR 302. Each node 306 advertises the available time slots within BLSR 302. As shown, source node A 306*a* advertises time slots 314*a*, 314*b* which are available to transfer data between node A 306*a* and node B 306*b*, and node A 306*a* and node D 306*d*, respectively.

Node A 306*a* also advertises a virtual link 318 between node A 306*a* and destination node C 306*c*. To determine virtual link 318 which, in the described embodiment, reflects time slots which are consistent, e.g., common or the same, on link 310*a* and 310*b*, node A 306*a* may process information pertaining to link 310*a* and link 310*b* to identify common time slots. Node A 306*a* may then form virtual link 318, and advertise virtual link 318.

When a circuit path segment is to be routed between node A 306*a* and node C 306*c*, node A 306*a* may select common time slots associated with virtual link 318 for use in routing the circuit path segment. It should be appreciated that although a virtual link 318 is effectively selected for use in routing a path segment, the actual path segment is routed on physical links associated with the common time slots identified by virtual link 318.

Figure 4A:
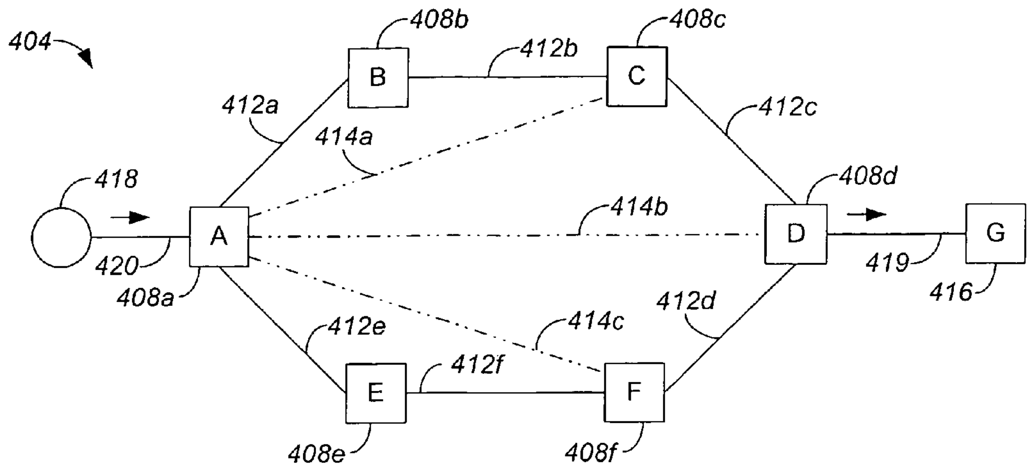
FIG. 4*a* is a diagrammatic representation of a BLSR with multiple virtual links associated with a first source node in accordance with an embodiment of the present invention.

With reference to FIG. 4*a*, the determination of virtual paths between a source node and a destination node will be described in more detail in accordance with an embodiment of the present invention. A BLSR 404 includes nodes 408 which may be interconnected by links 412 or, more specifically, fibers. In the described embodiment, BLSR 404 is a two fiber BLSR, although it should be understood that BLSR 404 may also be a four fiber BLSR. Additionally, the transport rates associated with BLSR 404 may vary. By way of example, BLSR 404 may be compliant with an OC-48 transport rate, an OC-192 transport rate, or an OC-768 transport rate. It should be appreciated that BLSR 404 may generally be interconnected with different protection architectures, e.g., BLSR 404 may be in communication with a unidirectional path switched ring (UPSR).

Data that is to be routed, e.g., in a clockwise direction, through BLSR 404 is provided to a source node A 408*a* from an external node 418. External node 418 is typically a termination or destination node of a segment of an overall circuit path which is to be routed through BLSR 404. External node 418 may be in communication with node A 408*a* through a link 420.

In order for data to be routed through BLSR 404 such that common working time slot or channel requirements may be substantially met, source node A 408*a* effectively advertises links, or more specifically, time slots, e.g., TDM time slots, that are available for use with respect to node A 408*a*. Such links may include physical links 412 and virtual links 414. Each node 408 within BLSR 404 is aware of substantially all available time slots of physical links 412 within BLSR 404.

Virtual links 414 facilitate a determination at node A 408*a* regarding which common time slots are available between node A 408*a* and substantially any node 408 in BLSR 404 which does not have a direct physical link to node A 408*a*. In the embodiment as shown, node A 408*a* has a virtual link 414*a* to node C 408*c*, a virtual link 414*b* to node D 408*d*, and a virtual link 414*c* to node F 408*f*.

To create virtual links 414 which begin at node A 408*a*, node A 408*a* uses information about time slots that are available in relevant links 412. For instance, to construct virtual link 414*a* between node A 408*a* and node C 408*c*, node A 408*a* may compare the available time slots on link 412*a* to the available time slots on link 412*b*, and identify common time slots. The time slots that are common between link 412*a* and link 412*b* may then be advertised as a direct link from node A 408*a* to node C 408*c* in the form of virtual link 414*a*.

Virtual link 414*a* between node A 408*a* and node C 408*c* allows node A 408*a* to advertise a time slot or time slots that are consistent or common on link 412*a* and link 412*b*, as previously mentioned. For example, if time slot "5" is available for use on link 412*a*, and time slot "5" is available for use on link 412*b*, then virtual link 414*a* effectively enables node A 408*a* to advertise a link, or a tunnel, between node A 408*a* and node C 408*c* that uses time slot "5." It should be appreciated that if time slot "6" is also available for use on link 412*a* and on link 412*b*, then virtual link 414*a* also enables node A 408*a* to advertise that time slot "6" is also available on virtual link 414*a*. Hence, virtual link 414*a* may be considered to be a representation of a substantially direct link between node A 408*a* and node C 408*c* which passes through intermediate node B 408*b*.

In addition to advertising time slots which are available on physical links 412 and virtual links 414, node A 408*a* also advertises the amount of bandwidth associated with physical links 412 and virtual links 414. As will be appreciated by those skilled in the art, bandwidth associated with each link 412 is dependent upon the number of available working time slots available on each link 412. By way of example, if link 412*a* is an OC-192 link, then the maximum bandwidth available on any given time slot of link 412*a* may carry a OC-48c signal, which is typically formed by concatenating forty eight synchronous transport signal level one (STS-1) signals then transmitting the concatenated signal optically. The minimum bandwidth available on any given time slot of link 412*a* may be a single STS-1, although if virtual tributary (VT) traffic may be carried, the bandwidth may be even smaller, e.g., consistent with a VT1.5 or a VT2.

The maximum bandwidth that is advertised with respect to virtual links 414 is dependent upon the number of time slots which are available with respect to the virtual links 414. For instance, if virtual link 414*a* is an OC-192 link, then the maximum bandwidth on a working time slot when all working time slots are available may be consistent with OC-48c. The minimum bandwidth, of VT traffic may not be carried, is typically STS-1. If some working time slots are not available, then the maximum bandwidth on a working time slot advertised with respect to virtual link 414*a* may be lower, as the total bandwidth available to the available working time slots is reduced.

Each node 408 in BLSR 404 is aware of available time slots on every other node 408 in BLSR 404, as will be appreciated by those skilled in the art. In one embodiment, each node 408 is also aware of substantially every virtual link 414 in BLSR 404. Knowledge of substantially every virtual link 414 may be obtained by nodes 408 when a node associated with a particular virtual link 414 advertises the particular virtual link 414. By way of example, node 408*a* may advertise the availability of virtual link 414*a*.

Virtual link 414*b* is a representation of a link between node A 408*a* and node D 408*d*. If time slot "5" is available on links 412*a–c*, then virtual link 414*b* may be viewed as a substantially direct link between node A 408*a* and node D 408*d*. Virtual link 414*c* is a representation of a link between node A 408*a* and node F 408*f* which uses consistent, e.g., the same or common, time slots in a segment of a circuit path that is created between node A 408*a* and node F 408*f*.

If node D 408*d* is a destination node, then node A 408*a* will either select a time slot associated with a direct physical link 412 to node D 408*d*, if one is available, or a time slot associated with a virtual link 414 to node D 408*d*. As shown, there is no direct physical link 412 between node A 408*a* and node D 408*d*. Therefore, node A 408*a* will select virtual link 414*b* for use in sending data to node D 408*d*.

It should be appreciated that by selecting virtual link 414*b*, a circuit path segment is effectively being routed between node A 408*a* and node D 408*d* using physical links 412*a–c*. In other words, the selection of virtual link 414*b*, which is associated with a specified time slot, essentially causes a path segment to be routed from node A 408*a* to node B 408*b* on the specified time slot of link 412*a*, from node B 408*b* to node C 408*c* on the specified time slot of link 412*b*, and from node C 408*c* to node D 408*d* on the specified time slot of link 412*c*. Once a path segment is routed through BLSR 404 from node A 408*a* to node D 308*d*, a segment may be routed from node D 308*d* to a node G 416, which is outside of BLSR 404, using a link 419.

In one embodiment, a virtual link, e.g., virtual link 414*a*, may advertise substantially all available time slots between node A 408*a* and node C 408*c*. Alternatively, separate virtual links may be advertised between node A 408*a* and node C 408*c* for each available time slot between node A 408*a* and node C 408*c*. For an embodiment in which each virtual link 414 may advertise more than one available time slot between two particular nodes 408, then the minimum and maximum available bandwidth associated with each virtual link 414 may also be advertised, as discussed above.

Figure 4B:
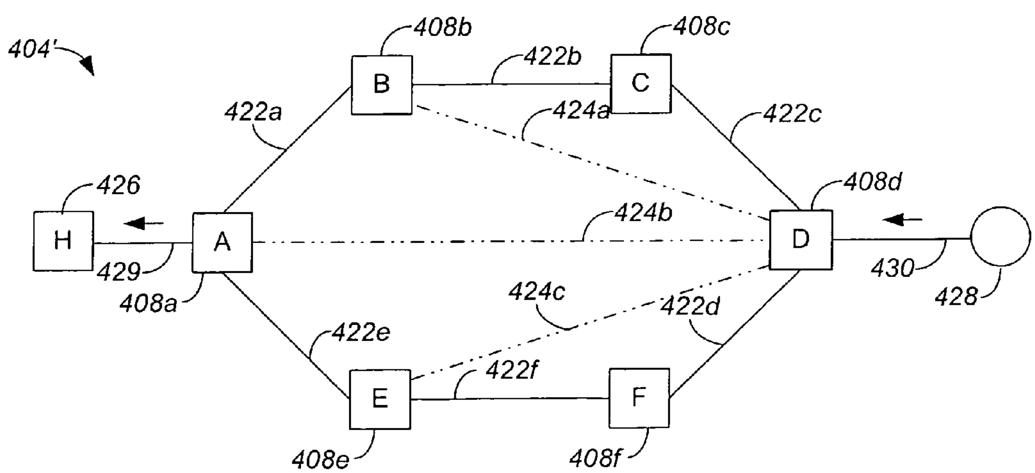
FIG. 4*b* is a diagrammatic representation of a BLSR, i.e., BLSR 404 of FIG. 4*a*, with multiple virtual links associated with a second source node in accordance with an embodiment of the present invention.

As shown in FIG. 4*b*, virtual links may be used in the creation of circuit path segments which are initiated at substantially any node within a BLSR. FIG. 4*b* is a diagrammatic representation of a BLSR which includes nodes 408 that have the capability to determine virtual links in accordance with an embodiment of the present invention. As previously mentioned, a BLSR generally has fibers which enable data to be transferred in two directions, e.g., in a clockwise direction and a counter-clockwise direction. BLSR 404, as shown in FIG. 4*a*, includes links 412 between nodes 408 which allow data to be transferred in a clockwise direction. A BLSR 404' is shown to include links 422 between nodes 408. It should be understood that links 412 and links 422 are generally included in BLSR 404. However, for ease of illustration, links 412 are illustrated in FIG. 4*a* and links 422 are illustrated in FIG. 4*b*.

Data that is to be routed through BLSR 404' from a source node D 408*d* to a destination node A 408*a* is received on source node D 408*d* from an external node 428 through link 430. Source node D 408*d* advertises time slots that are available for use with respect to node D 408*d*, as well as other nodes 408 within BLSR 404'. Such links may include physical links 422 and virtual links 424, once virtual links 424 are computed. Virtual links 424 facilitate a determination at node D 408*d* as to which common time slots are available between node D 408*d* and any other node 408 within BLSR 404' which does not have a direct physical link to node D 408*d*. As shown, node D 408*d* has a virtual link 424*a* to node B 408*b*, a virtual link 424*b* to node A 408*a*, and a virtual link 424*c* to node E 408*e*.

Figure 5:
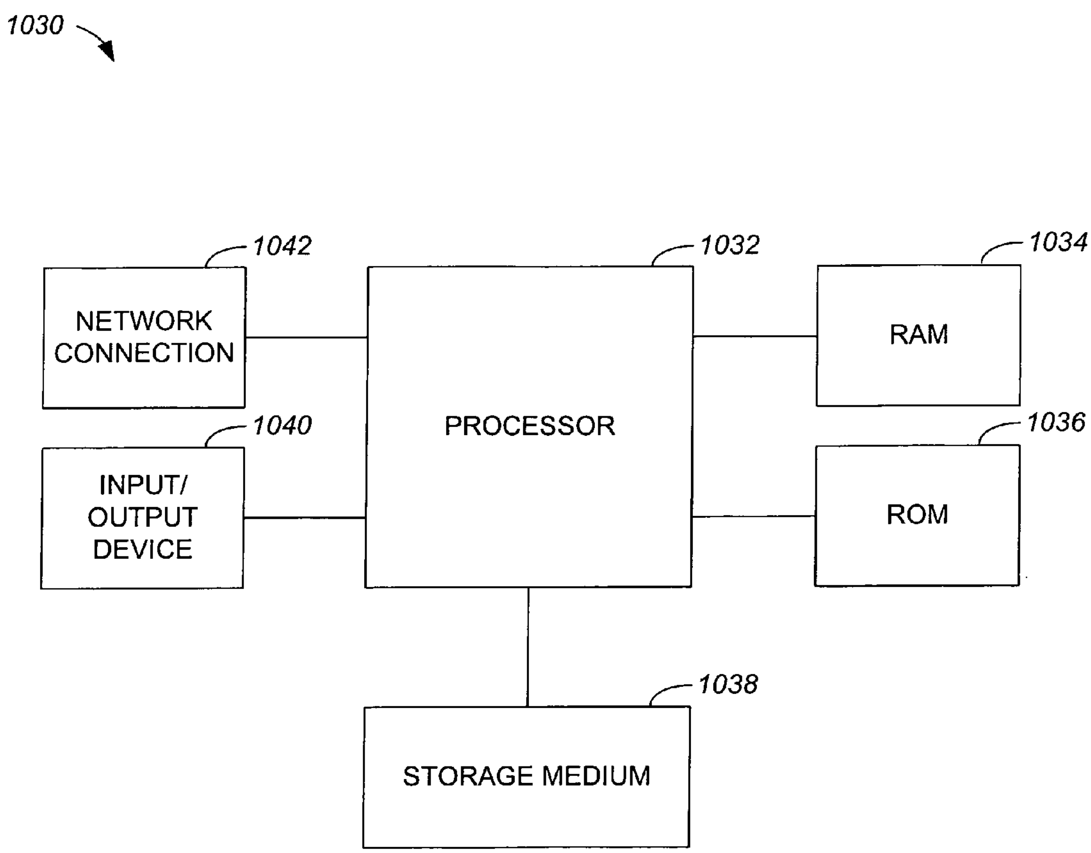
FIG. 5 is a representation of a general purpose computing system suitable for implementing the present invention.

The present invention may be implemented on network element, e.g., a node, within a BLSR. Typically, the node may either include or be associated with a computing device. FIG. 5 illustrates a typical, general purpose computing device or computer system suitable for implementing the present invention. A computer system 1030 includes any number of processors 1032 (also referred to as central processing units, or CPUs) that are coupled to memory devices including primary storage devices 1034 (typically a random access memory, or RAM) and primary storage devices 1036 (typically a read only memory, or ROM). ROM acts to transfer data and instructions uni-directionally to the CPU 1032, while RAM is used typically to transfer data and instructions in a bi-directional manner.

CPU 1032 may generally include any number of processors. Both primary storage devices 1034, 1036 may include any suitable computer-readable media. A secondary storage medium 1038, which is typically a mass memory device, is also coupled bi-directionally to CPU 1032 and provides additional data storage capacity. The mass memory device 1038 is a computer-readable medium that may be used to store programs including computer code, data, and the like. Typically, mass memory device 1038 is a storage medium such as a hard disk or a tape which is generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPU 1032.

CPU 1032 is also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1032 optionally may be coupled to a computer or telecommunications network, e.g., a local area network, an internet network or an intranet network, using a network connection as shown generally at 1042. With such a network connection, it is contemplated that the CPU 1032 might receive information from the network, or might output information to the network in the course of performing the above-described method steps. Such information, which is often represented as a sequence of instructions to be executed using CPU 1032, may be received from and outputted to the network, for example, in the form of a computer data signal embodied in a carrier wave. The above-described devices and materials will be familiar to those of skill in the computer hardware and software arts.

Figure 6:
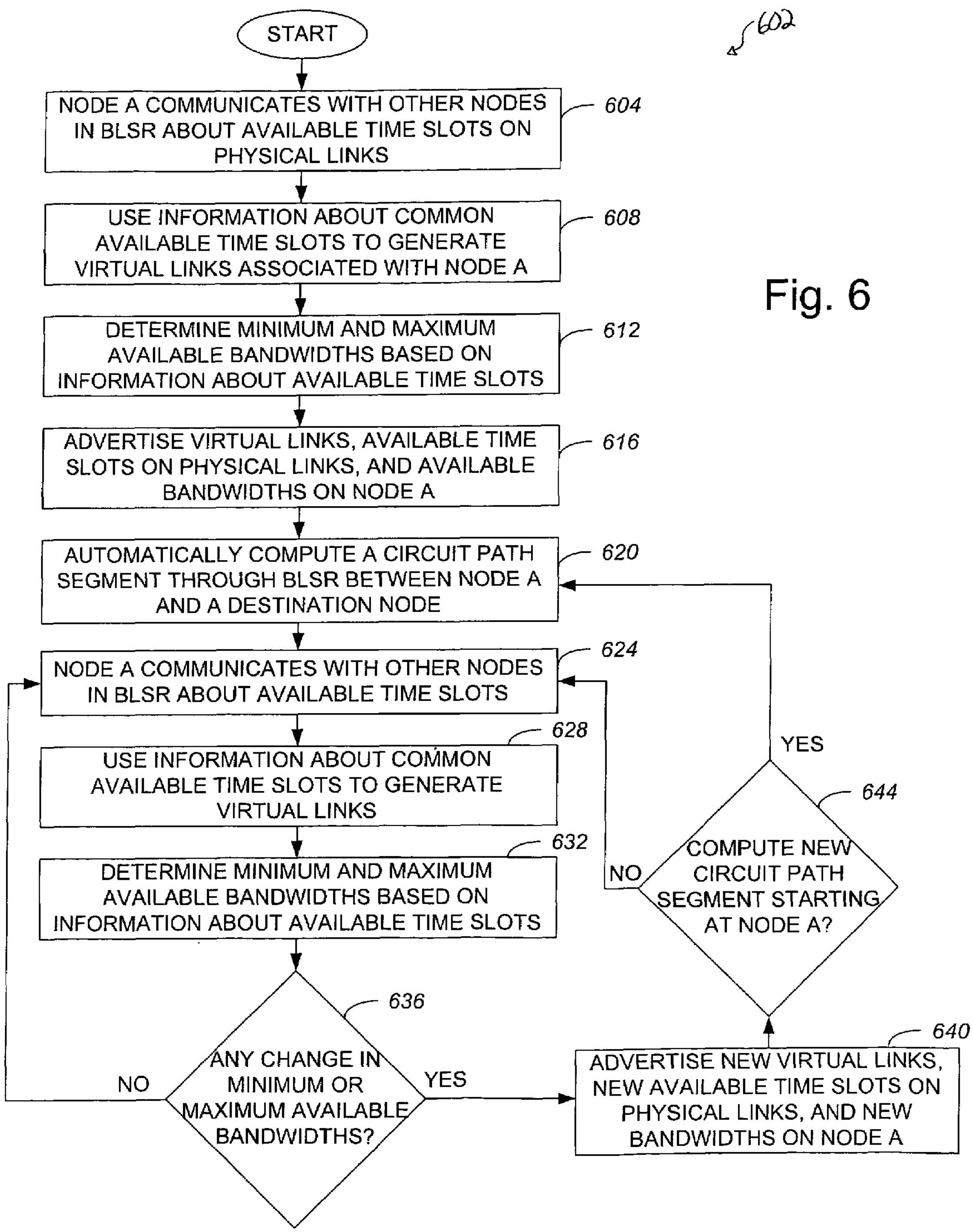
FIG. 6 is a process flow diagram which illustrates the steps associated with routing a path through a BLSR which uses common time slots in accordance with an embodiment of the present invention.

FIG. 6 is a process flow diagram which illustrates the steps associated with substantially automatically computing a circuit path segment through a BLSR which accounts for common channel or time slot requirements in accordance with an embodiment of the present invention. A process 602 of computing a circuit path segment which is initiated at a source node A begins at step 604 in which node A communicates with other nodes in a BLSR about available time slots on physical links. In other words, node A is made aware of which time slots are currently available for use in transferring data across specific links. It should be appreciated that within a BLSR, substantially all nodes are aware of which time slots are available on physical links within the BLSR.

Once node A is aware of available time slots on physical links, information pertaining to the available time slots may be used to generate virtual links associated with node A in step 608. That is, node A, or a computing device that is associated with or in communication with node A, computes virtual links associated with node A. A virtual link may be arranged to be used to advertise substantially all time slots available for use in transferring data between node A and the end node of the virtual link. In one embodiment, a computing device that is associated with node A may also compute virtual links for substantially all other nodes included in the BLSR.

After virtual links are generated in step 608, the available bandwidths associated with physical and virtual links may be determined in step 612. Typically, the minimum and maximum available bandwidths on virtual links and physical links are determined using information about available timeslots, e.g., by node A or by a computing device that is in communication with node A. In step 616, once available bandwidths are determined, the virtual links, available time slots on physical links, and available bandwidths are advertised on node A.

A suitable virtual link or a suitable physical link is selected in step 620, and a circuit path segment through the BLSR is computed between node A and a destination node. It should be appreciated that node A and the destination node may be in communication through a single physical link. Alternatively, node A may be in communication with the destination node through a virtual link, i.e., through more than one physical link. When a virtual link is used to transfer data between node A and the destination node, the actual circuit path segment passes through the physical links that are substantially identified by the virtual link.

Once a circuit path segment is computed between node A and a destination node, information regarding available time slots in the BLSR is updated. Accordingly, in step 624, node A communicates with other nodes in the BLSR about available time slots. In one embodiment, information regarding available time slots is substantially always updated, e.g., at predetermined intervals. In another embodiment, however, the information regarding available time slots may be updated in response to a request to route a circuit path segment through the BLSR. After information pertaining to available time slots is gathered, the information is used to generate virtual links in step 628, and available bandwidths for virtual links and physical links is determined in step 632 based on the information about available time slots.

From step 632, process flow proceeds to step 636 in which it is determined whether any change in minimum or maximum available bandwidths. In other words, it is determined whether the minimum and maximum available bandwidths have changed since the circuit path segment was computed in step 620. If it is determined that neither the minimum available bandwidth nor the maximum available bandwidth has changed, then process flow returns to step 624 where node A communicates with other nodes about available time slots.

Alternatively, if it is determined in step 636 that either or both the minimum available bandwidth and the maximum available bandwidth have changed, then process flow proceeds to step 640 in which new or updated virtual links, new or updated available time slots on physical links, and new bandwidths are advertised on node A. Then, in step 644, it is determined whether a new circuit path segment is to be computed starting at node A. If it is determined that a new circuit path segment starting at node A is to be computed, then process flow returns from step 644 to step 620 in which the circuit path segment is substantially automatically computed. On the other hand, if it is determined in step 644 that a new circuit path segment starting at node A is not to be computed, then process flow returns to step 624 in which node A communicates with other nodes in the BLSR about available time slots.

Although only a few embodiments of the present invention have been described, it should be understood that the present invention may be embodied in many other specific forms without departing from the spirit or the scope of the present invention. By way of example, although nodes within a BLSR have generally been described as using information pertaining to time slots which are free or available on physical links in order to effectively create virtual links, external computing devices may also be used to determine virtual links. In other words, computing devices which are in communication with nodes of a BLSR, but are substantially external to the nodes, may be used to create virtual links. As will be understood by those skilled in the art, BLSR protocols specify that time slot or channel information be exchanged only within a BLSR. In order to enable an external computing device to obtain such information, the external computing device may be in communication with a node which would send such information to the external computing device. The external computing device may then computer virtual paths and, hence, circuit path segments.

While the present invention has been described as being suitable for use with respect to a TDM network that is subject to SONET standards, the present invention is suitable for a variety of different networks. Other suitable networks include, but are not limited to, networks that are subject to a synchronous digital hierarchy (SDH) standard. Further, the methods of the present invention, as well as variations of the methods, are suitable for use with substantially any BLSR, e.g., two fiber or four fiber architectures.

In general, the steps associated with methods of computing a circuit path segment within a BLSR may be widely varied. Steps may be added, removed, altered, or reordered without departing from the spirit or the scope of the present invention. For example, steps associated with computing virtual links between different source nodes and destination nodes may be added. Therefore, the present examples are to be considered as illustrative and not restrictive, and the invention is not to be limited to the details given herein, but may be modified within the scope of the appended claims.

What is claimed is:

1. An apparatus for creating a path between a first network element and a second network element included in a bi-directional line switched ring, the bi-directional line switched ring including a third network element, the third network element being arranged to be in communication with the first network element across a first link, the third network element further being arranged to be in communication with the second network element across a second link, the apparatus comprising:

a querying device, the querying device being arranged to automatically identify at least a first time slot associated with the first link, the first time slot being available for use in transferring data between the first network element and the third network element, the querying device further being arranged to automatically identify at least a second time slot associated with the second link, the second time slot being available for use in transferring data between the third network element and the second network element;

a comparator, the comparator being arranged to compare the first time slot and the second time slot to determine when the first time slot and the second time slot are consistent; and a path computing device, the path computing device being arranged to automatically compute the path between the first network element and the second network element using the first time slot of the first link and the second time slot of the second link when the first time slot and the second time slot are consistent.

2. An apparatus according to claim 1 wherein the querying device is further arranged to identify all time slots associated with the first link that are available for use in transferring data between the first network element and the third network element, and to identify all time slots associated with the second link that are available for use in transferring data between the third network element and the second network element.

3. An apparatus according to claim 2 wherein the time slots associated with the first link that are available for use in transferring data between the first network element and the third network element are time slots that are currently available for use in transferring data between the first network element and the third network element, and wherein the time slots associated with the second link that are available for use in transferring data between the third network element and the second network element are time slots that are currently available for use in transferring data between the third network element and the second network element.

4. An apparatus according to claim 2 wherein the comparator is further arranged to compare the time slots associated with the first link that are available for use in transferring data between the first network element and the third network element and the time slots associated with the second link that are available for use in transferring data between the third network element and the second network element to identify a subset of time slots associated with the first link that are consistent with a subset of time slots associated with the second link.

5. An apparatus according to claim 4 wherein the subset of time slots associated with the first link that are consistent with the subset of time slots associated with the second link form a set of slot segments that are available between the first network element and the second network element, the apparatus further including:

a virtual link identifier, the virtual link identifier being arranged to provide the first network element with at least a first indicator which identifies the set of slot segments as being available for use in creating the path between the first network element and the second network element.

6. An apparatus according to claim 5 wherein the virtual link identifier is further arranged to provide the first network element with at least a second indicator which identifies the first time slot as being available for use in creating the path between the first network element and the second network element.

7. An apparatus according to claim 6 further including:

a physical link identifier, the physical link identifier being arranged to provide the first network element with at least a third indicator which identifies the first time slot as being available for use on the first link.

8. An apparatus according to claim 5 wherein the path computing device is further arranged to compute the path between the first network element and the second network element using a first slot segment selected from the set of slot segments.

9. A computing device, the computing device arranged to be included in a bi-directional line switch ring in a network that includes a plurality of network elements, the computing device further being arranged to be in communication with a first network element of the plurality of network elements through a first link, the first network element further being in communication with a second network element of the plurality of network elements through a second link, the computing device comprising:

computer code that causes querying, the computer code that causes querying being suitable for identifying at least a first time slot associated with the first link, the first time slot being available for use in transferring data between the computing device and the first network element, the computer code that causes querying further being suitable for identifying at least a second time slot associated with the second link, the second time slot being available for use in transferring data between the first network element and the second network element;

computer code that causes comparing, the computer code that causes comparing being suitable for comparing the first time slot and the second time slot to determine when the first time slot and the second time slot are consistent;

computer code that causes computing, the computer code that causes computing being suitable for computing a path between the computing device and the second network element using the first time slot of the first link and the second time slot of the second link when the first time slot and the second time slot are consistent;

a processor that executes the computer codes; and a computer readable medium that stores the computer codes.

10. A computing device according to claim 9 wherein the computer code that causes querying further identifies all time slots associated with the first link that are available for use in transferring data between the computing device and the first network element, and further identifies all time slots associated with the second link that are available for use in transferring data between the first network element and the second network element.

11. A computing device according to claim 10 wherein the computer code that causes comparing is suitable for comparing the time slots associated with the first link that are available for use in transferring data between the computing device and the first network element and the time slots associated with the second link that are available for use in transferring data between the first network element and the second network element to identify a subset of time slots associated with the first link that are consistent with a subset of time slots associated with the second link.

12. A computing device according to claim 11 wherein the subset of time slots associated with the first link that are consistent with the subset of time slots associated with the second link form a set of slot segments that are available between the first network element and the second network element, the computer device further including:

computer code that causes a virtual link to be identified, the computer code that causes the virtual link to be identified further being suitable for providing at least a first indicator which identifies the set of slot segments as being available for use in creating the path between the computing device and the second network element.

13. A computing device according to claim 12 further including:

computer code that causes a physical link to be identified, the computer code that causes the physical link to be identified being suitable for providing at least a third indicator which identifies the first time slot as being available for use on the first link.

14. A computing device according to claim 12 further including:

computer code that causes bandwidth to be determined, wherein the computer code that causes the bandwidth to be determined is arranged to determine a maximum bandwidth associated with the set of slot segments.

15. A computing device according to claim 14 wherein the computer code that causes the bandwidth to be determined is further arranged to determine a minimum bandwidth associated with the set of slot segments.

16. A computing device according to claim 12 wherein the computer code that causes computing is further suitable for computing the path between the computing device and the second network element using a first slot segment selected from the set of slot segments.

17. A computing device according to claim 16 wherein the computing device further includes:

computer code that causes data to be received; and computer code that causes data to be forwarded from the computing device to the second network element across the path.

18. A computing device according to claim 9 wherein the computer readable medium is one selected from the group consisting of a hard disk, a CD-ROM, a DVD, a computer disk, a tape drive, a computer memory, and a data signal embodied in a carrier wave.

19. An apparatus for creating a path between a first network element and a second network element included in a bi-directional line switched ring, the bi-directional line switched ring including a third network element, the third network element being in communication with the first network element across a first link, the third network element further being in communication with the second network element across a second link, the apparatus comprising:

means for querying, the means for querying being arranged to automatically identify at least a first time slot associated with the first link, the first time slot being available for use in transferring data between the first network element and the third network element, the means for querying further being arranged to automatically identify at least a second time slot associated with the second link, the second time slot being available for use in transferring data between the third network element and the second network element;

means for comparing, the means for comparing being arranged to compare the first time slot and the second time slot to determine when the first time slot and the second time slot are consistent; and means for computing, the means for computing being arranged to automatically compute the path between the first network element and the second network element using the first time slot of the first link and the second time slot of the second link when the first time slot and the second time slot are consistent.

20. An apparatus according to claim 19 wherein the means for querying is further arranged to identify all time slots associated with the first link that are available for use in transferring data between the first network element and the third network element, and to identify all time slots associated with the second link that are available for use in transferring data between the third network element and the second network element.

21. An apparatus according to claim 20 wherein the time slots associated with the first link that are available for use in transferring data between the first network element and the third network element are time slots that are currently available for use in transferring data between the first network element and the third network element, and wherein the time slots associated with the second link that are available for use in transferring data between the third network element and the second network element are time slots that are currently available for use in transferring data between the third network element and the second network element.

22. An apparatus according to claim 20 wherein the means for comparing is further arranged to compare the time slots associated with the first link that are available for use in transferring data between the first network element and the third network element and the time slots associated with the second link that are available for use in transferring data between the third network element and the second network element to identify a subset of time slots associated with the first link that are consistent with a subset of time slots associated with the second link.

23. An apparatus according to claim 22 wherein the subset of time slots associated with the first link that are consistent with the subset time slots associated with the second link form a set of slot segments that are available between the first network element and the second network element, the apparatus further including:

means for identifying at least one virtual link, the means for identifying the at least one virtual link being arranged to provide the first network element with at least a first indicator which identifies the set of slot segments as being available for use in creating the path between the first network element and the second network element.

24. An apparatus according to claim 23 further including:

means for identifying at least one physical link, the means for identifying the at least one physical link being arranged to provide the first network element with at least a third indicator which identifies the first time slot as being available for use on the first link.

25. An apparatus according to claim 24 wherein the apparatus is in direct communication with the first network element.

26. An apparatus for creating a path between first and second network elements in a bi-directional line switched ring, the apparatus comprising:

a querying device that automatically identifies a first time division multiplexed (TDM) time slot in a first link between the first network element and a third network element and a second TDM time slot in a second link between the third network element and the second network element;

a comparator that determines when the first time slot and the second time slot are consistent; and a path computing device that automatically computes a path between the first and second network elements using the first and second links when the first and second time slots are consistent.

27. An apparatus according to claim 26 wherein the querying device is further arranged to identify all TDM time slots in the first link and to identify all TDM time slots in the second link.

28. An apparatus according to claim 27 wherein the TDM time slots in the first link are currently available for use in transferring data between the first network element and the third network element, and wherein the TDM time slots in the second link are currently available for use in transferring data between the third network element and the second network element.

29. An apparatus according to claim 27 wherein the comparator is further arranged to compare the TDM time slots in the first link and the TDM time slots in the second link to identify a subset of TDM time slots in the first link that are consistent with a subset of TDM time slots in the second link.

30. An apparatus according to claim 29 wherein the subset of TDM time slots in the first link that are consistent with the subset of TDM time slots in the second link form a set of slot segments that are available between the first network element and the second network element, the apparatus further including:

a virtual link identifier, the virtual link identifier being arranged to provide the first network element with at least a first indicator which identifies the set of slot segments as being available for use in creating the path between the first network element and the second network element.

31. An apparatus according to claim 30 wherein the virtual link identifier is further arranged to provide the first network element with at least a second indicator which identifies the first TDM time slot as being available for use in creating the path between the first network element and the second network element.

32. An apparatus according to claim 31 further including:

a physical link identifier, the physical link identifier being arranged to provide the first network element with at least a third indicator which identifies the first TDM time slot as being available for use on the first link.

33. An apparatus according to claim 30 wherein the path computing device is further arranged to compute the path between the first network element and the second network element using a first slot segment selected from the set of slot segments.

34. A method for creating a circuit path segment between a source node and a destination node, the source node and the destination node being included in a bi-directional line switched ring, the bi-directional line switched ring further including at least one intermediate node, the source node being in communication with the intermediate node using a first link, the intermediate node being in communication with the destination node using a second link, the method comprising:

identifying a first channel that is available for use in transferring data, the first channel being associated with the first link;

identifying a second channel that is available for use in transferring the data, the second channel being associated with the first link;

determining when the first channel and the second channel are consistent; and advertising the first channel as being available for use for transferring the data from the source node and the destination node when it is determined that the first channel and the second channel are consistent, wherein the first channel is advertised on the source node.

35. A method as recited in claim 34 wherein determining when the first channel and the second channel are consistent includes determining when the first channel is substantially the same as the second channel.

36. A method as recited in claim 34 wherein advertising the first channel as being available for use for transferring the data from the source node and the destination node includes advertising the first channel as being at least a part of a virtual link between the source node and the destination node.

37. A method as recited in claim 36 further including:

computing the circuit path segment, wherein computing the circuit path segment includes selecting the virtual link for use in the circuit path segment.

38. A method as recited in claim 37 wherein selecting the virtual link for use in the circuit path segment includes routing the circuit path segment through the first channel and the second channel.

39. A computer program product for creating a circuit path segment between a source node and a destination node, the source node and the destination node being included in a bi-directional line switched ring, the bi-directional line switched ring further including at least one intermediate node, the source node being in communication with the intermediate node using a first link, the intermediate node being in communication with the destination node using a second link, the computer program product comprising:

computer code that causes a first channel that is available for use in transferring data to be identified, the first channel being associated with the first link;

computer code that causes a second channel that is available for use in transferring the data to be identified, the second channel being associated with the first link;

computer code that causes a determination to be made regarding when the first channel and the second channel are consistent;

computer code that causes the first channel to be advertised as being available for use for transferring the data from the source node and the destination node when it is determined that the first channel and the second channel are consistent, wherein the first channel is advertised on the source node; and a computer readable medium that stores the computer codes.

40. A computer program product as recited in claim 39 wherein the computer code that causes the determination to be made regarding when the first channel and the second channel are consistent includes computer code that causes a determination to be made regarding when the first channel is substantially the same as the second channel.

41. A computer program product as recited in claim 40 wherein the computer code that causes the first channel to be advertised as being available for use for transferring the data from the source node and the destination node includes computer code that causes the first channel to be advertised as being at least a part of a virtual link between the source node and the destination node.

42. A computer program product as recited in claim 41 further including:

computer code that causes the circuit path segment to be computed, wherein the computer code that causes the circuit path segment to be computed includes computer code that causes the virtual link to be selected for use in the circuit path segment.

43. A computer program product as recited in claim 42 wherein the computer code that causes the virtual link to be selected for use in the circuit path segment includes computer code for routing the circuit path segment through the first channel and the second channel.

44. A computer program product as recited in claim 40 wherein the computer-readable medium is one selected from the group consisting of a hard disk, a CD-ROM, a DVD, a computer disk, a tape drive, a computer memory, and a data signal embodied in a carrier wave.

* * * * *